(12) United States Patent
Kuroki et al.

(10) Patent No.: US 9,519,171 B2
(45) Date of Patent: Dec. 13, 2016

(54) ELECTRONIC DEVICE

(75) Inventors: Takao Kuroki, Hyogo (JP); Rei Tsukahara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 64 days.

(21) Appl. No.: 14/370,004

(22) PCT Filed: Apr. 18, 2012

(86) PCT No.: PCT/JP2012/002663
§ 371 (c)(1),
(2), (4) Date: Jun. 30, 2014

(87) PCT Pub. No.: WO2013/157038
PCT Pub. Date: Oct. 24, 2013

(65) Prior Publication Data
US 2014/0362328 A1 Dec. 11, 2014

(51) Int. Cl.
*G02F 1/1335* (2006.01)
*G02F 1/1333* (2006.01)
*F21V 8/00* (2006.01)

(52) U.S. Cl.
CPC ....... *G02F 1/133308* (2013.01); *G02B 6/0093* (2013.01); *G02F 1/133608* (2013.01); *G02F 2001/133317* (2013.01); *G02F 2001/133331* (2013.01)

(58) Field of Classification Search
CPC .............. G02F 1/133308; G02F 2001/133331; G02F 2001/133317; G02B 6/0093
See application file for complete search history.

(56) References Cited

U.S. PATENT DOCUMENTS

| | | |
|---|---|---|
| 2008/0278896 A1 | 11/2008 | Kawano |
| 2010/0328854 A1 | 12/2010 | Nakao et al. |
| 2012/0268686 A1 | 10/2012 | Lee et al. |
| 2013/0050820 A1 | 2/2013 | Shin |
| 2013/0114018 A1 | 5/2013 | Kim et al. |
| 2013/0236680 A1 | 9/2013 | Ahn et al. |

FOREIGN PATENT DOCUMENTS

| | | |
|---|---|---|
| CN | 101025507 A | 8/2007 |
| CN | 101526677 A | 9/2009 |
| JP | 2004-186171 A | 7/2004 |
| JP | 2008-281824 A | 11/2008 |
| JP | 2009-69334 A | 4/2009 |
| JP | 102162942 A | 8/2011 |

*Primary Examiner* — Dung Nguyen
(74) *Attorney, Agent, or Firm* — Birch, Stewart, Kolasch & Birch, LLP

(57) ABSTRACT

An electronic device includes: a backlight holding case 8 accommodating a light guide plate 7; a design frame 3 which includes a flange part 3a protruding inward from a peripheral edge of a frame opening, and a design panel part 3b protruding outward therefrom, and which is attached to an opening of a backlight holding case 8 to sandwich the plate 7 between the flange part 3a and backlight holding case 8; a protective-plate-attached liquid crystal display panel 2 in which a protective plate 2a is mounted on a display surface, and which the outer peripheral part of the protective plate 2a is fixed to the panel part 3b, and the back side is illuminated with light from the light source guided by the plate 7; and a rear side case 4 assembled to the design frame 3 fixed by the panel 2 through the panel part 3b.

1 Claim, 5 Drawing Sheets

ELECTRONIC DEVICE

TECHNICAL FIELD

The present invention relates to an electronic device that has a display part such as a liquid crystal display device.

BACKGROUND ART

For example, Patent Document 1 discloses an electronic device of a conventional general structure having a liquid crystal display part. The electronic device includes a casing composed of a front side case in which an opening is formed, and a rear side case assembled to this, and the liquid crystal display part is accommodated at a position opposite to the opening inside the casing.

PRIOR ART DOCUMENTS

Patent Documents

Patent Document 1: Japanese Unexamined Patent Application Publication No. 2004-186171

SUMMARY OF THE INVENTION

Problems to be Solved by the Invention

In a conventional technique represented by Patent Document 1, since a front side case serving as a design panel, and a liquid crystal display part are constituted by different components, a structure for fixing the liquid crystal display part and the front side case is required. For this reason, the structure is complicated, and the number of components such as adhesive, screw, exposure prevention cushion, and electrostatic damage prevention component tends to increase. An increase in the number of components leads to complication of manufacturing processes and an increasing cost of a product.

Moreover, since the liquid crystal display part and the front side case are separate components, a range in thickness tolerance of the liquid crystal display part and the front side case becomes wider, so that the thickness of a device main body tends to increase. In this case, it is not easy to adjust the height position of the surface of the liquid crystal display part relative to the surface of the front side case. For this reason, it is difficult that a light transmission window for display attached to the front side case is flush with the front side case on the basis of the height position of the surface of the liquid crystal display part.

In the conventional, there are many cases to cope with the above drawback with a design such that the light transmission window for display is protruded from the front side case or recessed reversely.

The present invention is made to solve the foregoing problems, and an object of the invention is to obtain an electronic device capable of achieving a thinner device by reducing the number of parts.

Means for Solving the Problems

An electronic device according to the present invention includes: a case of which one surface is open, and which accommodates an illumination light source part that includes a light guide body; a design frame which includes a flange part that protrudes inward from a peripheral edge of a frame opening, and a design panel part that protrudes outward from the peripheral edge of the frame opening to thus constitute an exterior design on a display surface side, and which is attached to an opening of the case to thus sandwich the light guide body between the flange part and the case; a liquid crystal display panel in which a protective plate is mounted on a display surface, and which an outer peripheral part of the protective plate is fixed to the design panel part, and thus a back side thereof is illuminated with light from a light source guided by the light guide body; and a casing body on a rear side which is assembled to the design frame to which the liquid crystal display panel is fixed through the design panel part.

Effect of the Invention

According to the present invention, there is an advantageous effect such that it is possible to reduce the number of constituent components and to decrease the thickness of the electronic device.

BEST MODE FOR CARRYING OUT THE INVENTION

In the following, in order to describe the present invention in more detail, an embodiment for carrying out the invention will be described with reference to the accompanying drawings.

Embodiment 1

Figure 1:
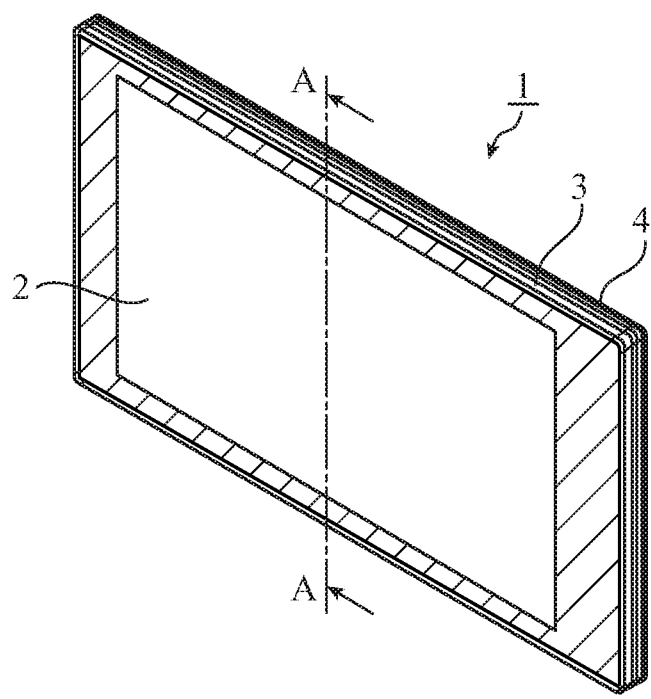
FIG. 1 is a perspective view illustrating an electronic device having a liquid crystal display part.

FIG. 1 is a perspective view illustrating an electronic device provided with a liquid crystal display part. An electronic device 1 illustrated in FIG. 1 is a portable electronic device such as a smartphone or a portable navigation device (PND) provided with a liquid crystal display part. In a design panel part 3 of the electronic device 1, a protective-plate-attached liquid crystal display panel 2 is assembled so a display surface side thereof, and a rear side case 4 is assembled to a rear side thereof.

Figure 2:
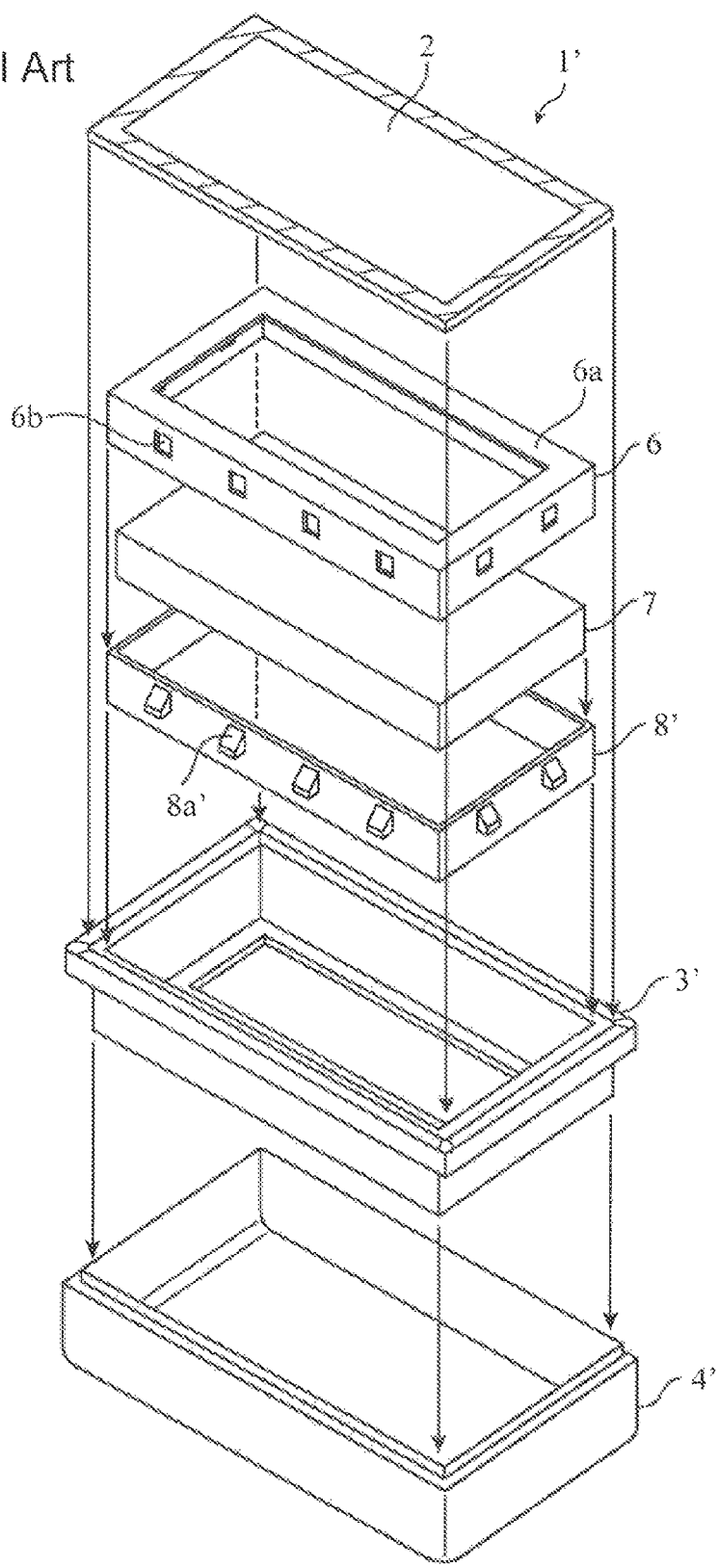
FIG. 2 is an exploded perspective view illustrating a configuration of a conventional electronic device.
Figure 3:
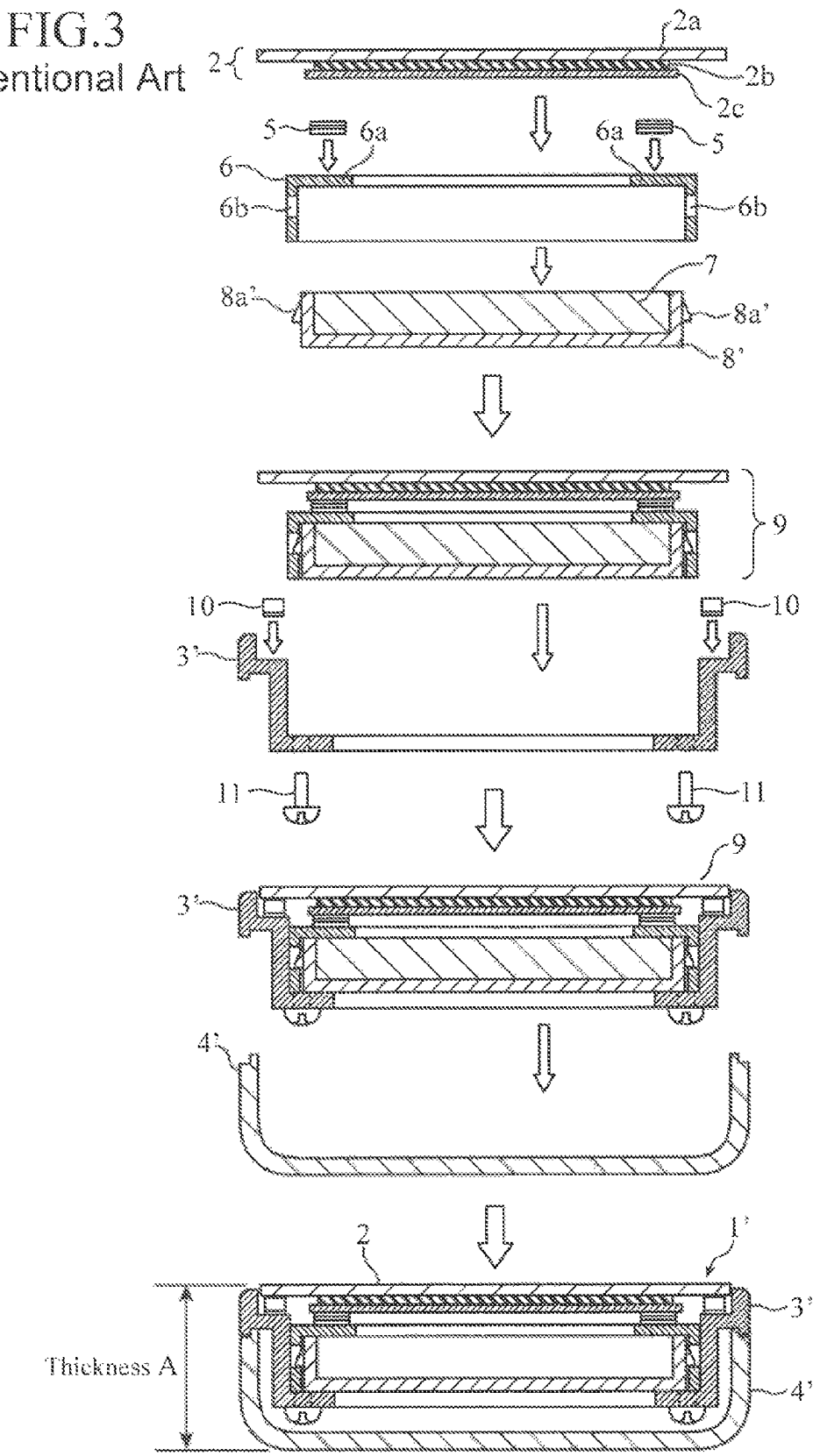
FIG. 3 is an exploded cross-sectional view illustrating the configuration of the conventional electronic device.

FIG. 2 is an exploded perspective view illustrating a configuration of a conventional electronic device, and schematically illustrates a conventional general configuration (a configuration disclosed in Patent Document 1) of the electronic device illustrated in FIG. 1. In addition, FIG. 3 is an exploded cross-sectional view illustrating the configuration of the conventional electronic device, and illustrates cross-sections of respective components of the electronic device of FIG. 2 in an arrow direction taken along a line A-A of FIG. 1. As illustrated in FIG. 2, a conventional electronic device 1' includes a protective-plate-attached liquid crystal display panel 2, a design panel part 3', a rear side case 4', a backlight holding frame 6, a light guide plate 7, and a backlight holding case 8'.

As illustrated in FIG. 3, the protective-plate-attached liquid crystal display panel 2 includes a liquid crystal panel 2c in which a protective plate 2a is adhered to a display surface side thereof by a resin adhesive 2b. The protective plate 2a is a planar member that is formed of a transparent material, and protects the display surface of the liquid crystal panel 2c from the outside. The liquid crystal panel 2c has a structure such that a liquid crystal layer is sandwiched between transparent substrates of the display surface side and the rear side, and is composed of an electrode structure that applies an electric field to the liquid crystal layer, a color filter, a polarizing plate, and the like, and a backlight beam is irradiated thereto from the rear side to thus display an image.

The backlight holding frame 6 is the frame in which a flange part 6a that protrudes inward from a peripheral edge of a frame opening is formed. In addition, the light guide plate 7 irradiates light, which is emitted from a light source for backlight (not illustrated in FIG. 2) such as an LED, to the rear surface of the liquid crystal display panel 2 as diffusion light. The backlight holding case 8' is the case whose one side is open. When the backlight holding frame 6 is attached to the opening of the backlight holding case 8', the light guide plate 7 is sandwiched between the flange part 6a and the backlight holding case 8' to be held.

Note that an illumination light source part that includes the light guide plate 7, various optical sheets, a light source, and the like (not illustrated except the light guide plate 7) is accommodated in a holding casing that includes the backlight holding frame 6 and the backlight holding case 8'.

The design panel part 3' is a design casing that constitutes an exterior design on the display surface side of the electronic device 1', and arranged with the protective-plate-attached liquid crystal display panel 2 and the holding casing in which the illumination light source part including the light guide plate 7 is accommodated. Moreover, the rear side case 4' is a casing body that is assembled to the design panel part 3'. That is, the design panel part 3' and the rear side case 4' form the casing body of the electronic device 1'.

The outer peripheral part of the protective-plate-attached liquid crystal display panel 2 is attached to the flange part 6a of the backlight holding frame 6 by a double-sided adhesive tape 5 as illustrated in FIG. 3. Moreover, the backlight holding case 8' that accommodates the light guide plate 7 is fitted to the backlight holding frame 6 as illustrated in FIG. 3. At this time, an engagement claw 8a' formed on a side of the backlight holding case 8' is fitted into an engagement hole 6b formed on a side of the backlight holding frame 6, so that the backlight holding frame 6 and the backlight holding case 8' are fixed thereto.

It is noted that a structure that includes the protective-plate-attached liquid crystal display panel 2, the backlight holding frame 6, and the backlight holding case 8' that accommodates the light guide plate 7 is referred to as a protective plate-attached liquid crystal module 9. The protective-plate-attached liquid crystal module 9 corresponds to the display part disclosed in Patent Document 1.

The protective-plate-attached liquid crystal module 9 is assembled to the design panel part 3' by screwing with a screw 11. At this time, as illustrated in FIG. 3, an elastic cushion 10 is arranged between an opening step of the design panel part 3' and the outer peripheral part of the protective plate 2a. The elastic cushion 10 is adhered to the opening step of the design panel part 3' or the outer peripheral part of the protective plate 2a, and does not mutually connect the opening step of the design panel part 3' and the outer peripheral part of the protective plate 2a.

This is due to the following reasons. Since the outer peripheral part of the protective-plate-attached liquid crystal display panel 2 is attached to the flange part 6a of the backlight holding frame 6 by the double-sided adhesive tape 5, when the outer peripheral part of the protective plate 2a is adhered to the opening step of the design panel part 3' without arranging the elastic cushion 10, the protective plate-attached liquid crystal display panel 2 is redundantly fixed to both the backlight holding frame 6 and the design panel part 3' which are different members to thereby generate a plane distortion stress. The protective-plate-attached liquid crystal display panel 2 is distorted due to the plane distortion stress, which causes display unevenness.

Due to this, in the conventional, the elastic cushion 10 is provided between the opening step of the design panel part 3' and the outer peripheral part of the protective plate 2a in order to avoid infiltration of dust, moisture, and/or the like, and avoid exposure from the inside of the liquid crystal display panel.

The rear side case 4' is assembled to the design panel part 3' to which the protective-plate-attached liquid crystal module 9 is assembled. In this manner, the protective plate-attached liquid crystal display panel 2, the backlight holding frame 6, the backlight holding case 8', and the design panel part 3' are arranged in order inside the rear side case 4'. Accordingly, a thickness dimension tolerance of these constituent members has to be taken into consideration for a thickness A of the electronic device 1', and due to a wider range of the thickness dimension tolerance, the thickness A tends to be thicker.

Moreover, in the conventional, in the protective plate-attached liquid crystal module 9, also, the thickness tolerance of the protective-plate-attached liquid crystal display panel 2, the backlight holding frame 6, and the backlight holding case 8' has to be taken into consideration, and thus it is not easy to adjust a protrusion/recess of the protective-plate-attached liquid crystal module 9 in relation to the design panel part 3'. For this reason, it is difficult that the display surface side of the design panel part 3' is flush with the protective-plate-attached liquid crystal module 9, and there are some cases such that the protective-plate-attached liquid crystal module 9 is unwillingly protruded or indented from the display surface side of the design panel part 3'.

Thus, in the present invention, instead of the backlight holding frame 6, a design frame is used to include: a flange part that protrudes inward from a peripheral edge of a frame opening; and a design panel part that protrudes outward from the peripheral edge of the frame opening to thus constitute an exterior design on a display surface side. That is, a design casing on the display surface side is configured with a frame in which the backlight holding frame 6 and the design panel part 3' are integrated. With such a configuration, it is possible to achieve a thinner device by reducing the number of parts thereof.

Figure 4:
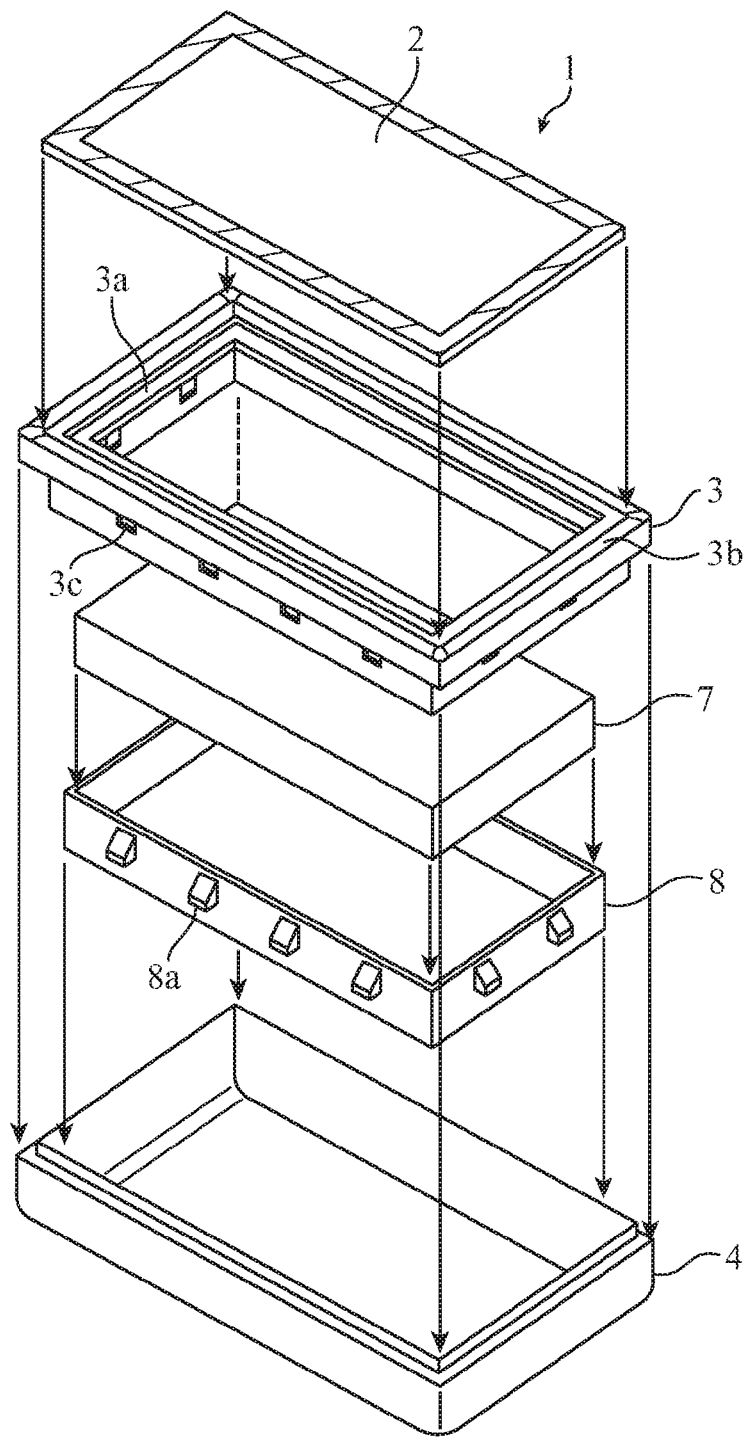
FIG. 4 is an exploded perspective view illustrating a structure of an electronic device according to Embodiment 1 of the present invention.
Figure 5:
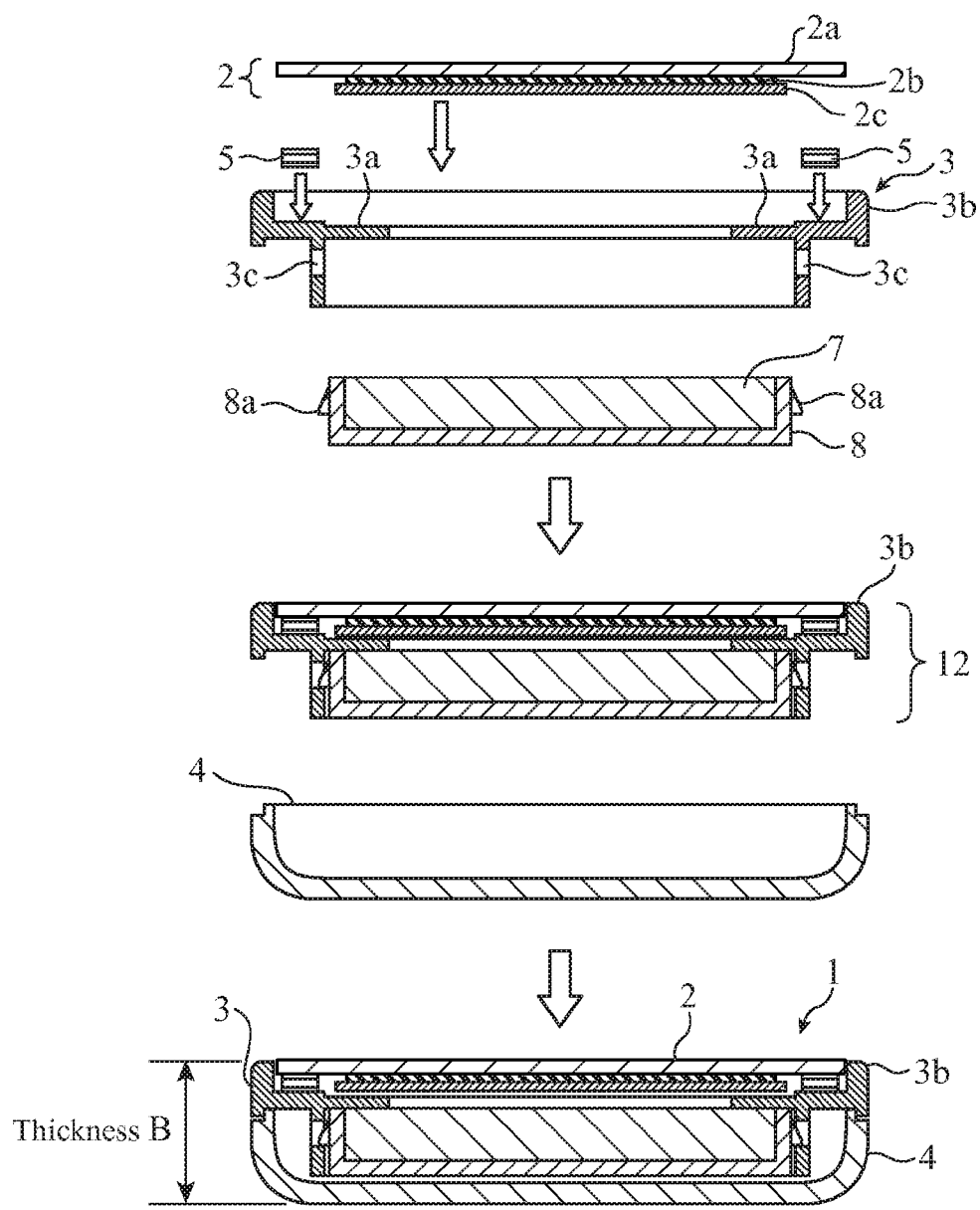
FIG. 5 is an exploded cross-sectional view illustrating the structure of the electronic device according to Embodiment 1.

FIG. 4 is an exploded perspective view illustrating a structure of an electronic device according to Embodiment 1 of the present invention, and schematically illustrates a configuration of the electronic device according to Embodiment 1. In addition, FIG. 5 is an exploded cross-sectional view illustrating the structure of the electronic device according to Embodiment 1, and illustrates cross-sections of respective components of the electronic device of FIG. 4 in the arrow direction taken along the line A-A of FIG. 1. As illustrated in FIG. 2 (FIG. 4), the electronic device 1 includes a protective-plate-attached liquid crystal display panel 2, a design frame 3, a rear side case 4, a light guide plate 7, and a backlight holding case 8. Note that the protective-plate-attached liquid crystal display panel 2 has the same configuration as the conventional configuration illustrated in FIGS. 2 and 3.

The design frame 3 is the frame that includes a flange part 3a that protrudes inward from a peripheral edge of a frame opening, and a design panel part 3b that protrudes outward from the peripheral edge of the frame opening to thus constitute an exterior design on a display surface side. The design frame 3 is attached to an opening of the backlight holding case 8, and the flange part 3a interposes the light guide plate 7 with the backlight holding case 8.

The outer peripheral part of the protective plate 2a of the protective-plate-attached liquid crystal display panel 2 is fixed to the design panel part 3b of the design frame 3. The rear side case 4 is assembled to the design frame 3 to which the protective-plate-attached liquid crystal display panel 2 is fixed through the design panel part 3b. That is, the design frame 3 and the rear side case 4 forms a casing body of the electronic device 1.

In this manner, by employing the design frame 3 in which the design panel that constitutes the exterior design on the display surface side and the holding casing that covers inner parts such as the light guide plate 7 are integrated, it is possible to obtain functions based on both the constituent components and to reduce the number of parts thereof.

The backlight holding case 8 that accommodates the light guide plate 7 is fitted to the design frame 3 as illustrated in FIG. 5. At this time, an engagement claw 8a formed on a side of the backlight holding case 8 is fitted into an engagement hole 3c formed on a side of the design frame 3, so that the design frame 3 and the backlight holding case 8 are fixed thereto.

A structure that includes the protective-plate-attached liquid crystal display panel 2, the design frame 3, and the backlight holding case 8 that accommodates the light guide plate 7 is referred to as a protective-plate-attached liquid crystal module 12.

In the protective-plate-attached liquid crystal module 12, the outer peripheral part of the protective plate 2a are merely attached to the design panel part 3b of the design frame 3 by the double-sided adhesive tape 5, and the structure is simplified. For example, it is possible to eliminate the screw fixing structure for assembling the protective-plate-attached liquid crystal module 9 to the design panel part 3' like the conventional.

Moreover, in the protective-plate-attached liquid crystal module 12, the outer peripheral part of the protective plate 2a is fixed to the design panel part 3b, and the protective-plate-attached liquid crystal display panel 2 is attached to the design frame 3, and hence, there is no need to be concerned about a matter in which the protective-plate-attached liquid crystal display panel 2 is redundantly fixed to a different constituent member like the conventional.

The rear side case 4 is assembled to the protective-plate-attached liquid crystal module 12 through the design panel part 3. In this manner, the protective-plate-attached liquid crystal display panel 2, the design frame 3, and the backlight holding case 8 are arranged in order inside the rear side case 4.

Therefore, in the electronic device 1 according to Embodiment 1, a member in which the thickness dimension tolerance should be taken into consideration is reduced, and it is thus possible to configure a thickness B of the electronic device 1 to be thinner than the thickness A of the conventional electronic device 1'.

Moreover, in the electronic device 1 according to Embodiment 1, the thickness dimension tolerance of the protective-plate-attached liquid crystal display panel 2 and the double-sided adhesive tape 5 have only to be taken into consideration for a protrusion/recess of the protective-plate-attached liquid crystal module 12 in relation to the design frame 3. For this reason, the protrusion/recess of the protective-plate-attached liquid crystal module 13 (12) in relation to the design frame 3 can be easily adjusted, and degree of freedom of the design can be enhanced. For example, an electronic device based on a design in which the display surface side of the design frame 3 is flush with the protective-plate-attached liquid crystal module 12, which is difficult in the conventional, can be easily produced.

Incidentally, when the design frame 3 is configured using a conductive member containing surface plating or the like, destruction thereof by static electricity can be prevented. In this case, a conductive member and a non-conductive member may be integrally molded to produce the design frame 3. With such a configuration, for example, a design in which an appearance part close to metal in the conductive member and an appearance part such as resin in the non-conductive member are mixed can be achieved to further improve degree of freedom of the design.

As described above, according to Embodiment 1, the device includes: the backlight holding case 8 of which one surface is open and which accommodates the illumination light source part that includes the light guide plate 7; the design frame 3 which includes the flange part 3a that protrudes inward from the peripheral edge of the frame opening, and the design panel part 3b that protrudes outward from the peripheral edge of the frame opening to thus constitute the exterior design on the display surface side, and which is attached to the opening of the backlight holding case 8 to sandwich the light guide plate 7 between the flange part 3a and the backlight holding case 8; the protective-plate-attached liquid crystal display panel 2 in which the protective plate 2a is mounted on the display surface, and which the outer peripheral part of the protective plate 2a is fixed to the design panel part 3b, so that the back side thereof is illuminated with the light from the light source guided by the light guide plate 7; and the rear side case 4 which is the casing body on the rear side, and which is assembled to the design frame 3 to which the protective-plate-attached liquid crystal display panel 2 is fixed thereto through the design panel part 3b.

With such a configuration, it is possible to achieve a thinner device by reducing the number of parts thereof.

It is noted that in the present invention, a modification of arbitrary components in the embodiment or an omission of arbitrary components in the embodiment is possible within a range of the invention.

INDUSTRIAL APPLICABILITY

In the electronic device of the present invention, it is possible to achieve a thinner device by reducing the number of parts thereof, and it is thus suitable for a display device of a portable terminal which is carried by a user to be used in various environments.

1, 1': ELECTRONIC DEVICE
2: PROTECTIVE-PLATE-ATTACHED LIQUID CRYSTAL DISPLAY PANEL
2a: PROTECTIVE PLATE

2b: RESIN ADHESIVE
2c: LIQUID CRYSTAL PANEL
3: DESIGN FRAME
3a, 6a: FLANGE PART
3b: DESIGN PANEL PART
3c, 6b: ENGAGEMENT HOLE
3': DESIGN PANEL PART
4, 4': REAR SIDE CASE
5: DOUBLE-SIDED ADHESIVE TAPE
6: BACKLIGHT HOLDING FRAME
7: LIGHT GUIDE PLATE
8, 8': BACKLIGHT HOLDING CASE
8a, 8a': ENGAGEMENT CLAW
9, 13: PROTECTIVE-PLATE-ATTACHED LIQUID CRYSTAL MODULE
10: ELASTIC CUSHION
11: SCREW.

The invention claimed is:

1. An electronic device comprising:

a case of which one surface is open, and which accommodates an illumination light source part that includes a light guide body;

a generally planar liquid crystal display panel in which a protective plate is mounted on a display surface;

a design frame which includes a flange part that protrudes inwardly toward the liquid crystal display panel from a peripheral edge of the design frame, and a design panel part that protrudes outward from the peripheral edge of the design frame in a direction generally perpendicularly from the liquid crystal display panel to constitute an exterior design on a display surface side, the flange part being attached to sides of the case to sandwich the light guide body between the flange part and the case;

the liquid crystal display panel having an outer peripheral part of the protective plate fixed to the design panel part, and thus a back side thereof being illuminated with light from a light source guided by the light guide body; and a casing body on a rear side which is assembled to the design frame to which the liquid crystal display panel is fixed through the design panel part.

* * * * *